United States Patent
Gui et al.

(10) Patent No.: US 12,521,732 B2
(45) Date of Patent: Jan. 13, 2026

(54) PRE-FLOTATION HIGH EFFICIENCY SLURRY CONDITIONING DEVICE FOR WIDE-PARTICLE-GRADE FLOTATION

(71) Applicant: CHINA UNIVERSITY OF MINING AND TECHNOLOGY, Xuzhou Jiangsu (CN)

(72) Inventors: Xiahui Gui, Jiangsu (CN); Yaowen Xing, Jiangsu (CN); Shihao Ding, Jiangsu (CN); Yijun Cao, Jiangsu (CN); Jiongtian Liu, Jiangsu (CN); Tao Che, Jiangsu (CN); Fancai Meng, Jiangsu (CN); Youfei Zhang, Jiangsu (CN); Mengdi Xu, Jiangsu (CN); Min Liu, Jiangsu (CN); Liyong Wei, Jiangsu (CN)

(73) Assignee: CHINA UNIVERSITY OF MINING AND TECHNOLOGY, Xuzhou Jiangsu (CN)

( * ) Notice: Subject to any disclaimer, the term of this patent is extended or adjusted under 35 U.S.C. 154(b) by 628 days.

(21) Appl. No.: 17/911,769

(22) PCT Filed: Nov. 27, 2020

(86) PCT No.: PCT/CN2020/132022
§ 371 (c)(1),
(2) Date: Sep. 15, 2022

(87) PCT Pub. No.: WO2021/258632
PCT Pub. Date: Dec. 30, 2021

(65) Prior Publication Data
US 2023/0138748 A1  May 4, 2023

(30) Foreign Application Priority Data

Jun. 22, 2020  (CN) .......................... 202010572176.X

(51) Int. Cl.
*B03D 1/16* (2006.01)

(52) U.S. Cl.
CPC ............ *B03D 1/16* (2013.01); *B03D 2201/02* (2013.01); *B03D 2203/08* (2013.01)

(58) Field of Classification Search
CPC ...... B03D 1/02; B03D 1/1406; B03D 1/1412; B03D 1/1456; B03D 1/16; B03D 1/247; B03D 2201/02; B03D 2203/08
See application file for complete search history.

(56) References Cited

U.S. PATENT DOCUMENTS

| | | | |
|---|---|---|---|
| 4,750,994 A * | 6/1988 | Schneider | B03D 1/22 210/219 |
| 5,096,572 A | 3/1992 | Hwang | |
| 5,454,935 A * | 10/1995 | Magaraggia | D21B 1/327 210/197 |
| 9,339,778 B2 * | 5/2016 | Koizumi | B01J 8/10 |

FOREIGN PATENT DOCUMENTS

| | | |
|---|---|---|
| CN | 200963607 Y | 10/2007 |
| CN | 102580861 A | 7/2012 |
| (Continued) | | |

OTHER PUBLICATIONS

English Translation of International Search Report corresponding to International Patent Application No. PCT/CN2020/132022 dated Mar. 22, 2021.

*Primary Examiner* — Dirk R Bass
(74) *Attorney, Agent, or Firm* — KDW FIRM PLLC

(57) ABSTRACT

A pre-flotation high efficiency slurry conditioning device for wide-particle-grade flotation, suitable for coal slime flotation. Said device comprises a slurry conditioning drum (15) having a columnar structure on top and an inverted frustrum structure below, an ore slurry outlet (4) is provided at an upper part of a side wall, ore slurry pump separation openings (5) are provided at two sides below the ore slurry outlet (4), ore slurry jet openings (17) are respectively (Continued)

provided at two sides of the columnar structure, and circular cutting isolation plates (11) and flow guide plates (10) are provided in alternation at inner sides of the upper half of the slurry conditioning drum (15); a dual channel jet circulation chemical feed system comprises chemical feed pipes (13), each chemical feed pipe (13) comprises an inlet end, a diffusion end, and a chemical feed pipe opening arranged at a throat area of said pipe, the inlet end is connected to a three-way pipe by means of a centrifugal pump (8), which is connected to an ore slurry inlet (6) and an ore slurry pump separation opening (5), a mixing shaft (7) is provided in the axial direction within the slurry conditioning drum (15), a plurality of mixing impellers (14) are arranged on the mixing shaft (7), and the bottom-most two mixing impellers (14) and the lowest two circular cutting isolation plates (11) are arranged at a same horizontal height. The present apparatus can effectively improve coal slime hydrophobic flocculation and fine slime separation, improve an ore slurry preprocessing effect, and effectively alleviate internal flow field pressure within a flotation device.

6 Claims, 1 Drawing Sheet

(56) References Cited

FOREIGN PATENT DOCUMENTS

| | | |
|---|---|---|
| CN | 203076082 U | 7/2013 |
| CN | 204338354 U | 5/2015 |
| CN | 207204390 U | 4/2018 |
| CN | 209005951 U | 6/2019 |
| CN | 111871619 A | 11/2020 |
| CN | 111871620 A | 11/2020 |
| KR | 200000019397 | 4/2000 |

* cited by examiner

PRE-FLOTATION HIGH EFFICIENCY SLURRY CONDITIONING DEVICE FOR WIDE-PARTICLE-GRADE FLOTATION

TECHNICAL FIELD

The present invention relates to a pre-flotation high efficiency slurry conditioning device, in particular to a pre-flotation high efficiency slurry conditioning device for wide-particle-grade flotation, which is applicable to coal slime flotation.

BACKGROUND ART

Flotation is the most cost-effective separation method for coal and mineral resources, and has made outstanding contributions to the large-scale recovery of valuable resources in fine-particle low-grade coal and ore. A flotation process is carried out by utilizing the surface interface properties of particles. Particles with high surface hydrophobicity tend to adhere to bubbles and float up as concentrate, while hydrophilic gangue particles remain in the ore slurry and are discharged as tailings. As the mechanized mining and heavy media separation processes are widely applied, the problems such as a large amount of floating slime, high content of intergrowth and a narrow effective separation range have become increasingly prominent. Therefore, improving the flotation equipment, refining the separation process, widening the flotation range and improving the separation efficiency are important measures to deal with the current problems related to coal resources.

Slurry conditioning is the basis of accurate separation of coal slime. The main function of slurry conditioning is to realize the dispersion of conventional nonpolar collecting agents in the ore slurry, enhance the selective collision and adsorption between the oil droplets of the collecting agents and the coal slime particles, and improve the hydrophobicity difference between cleaned coal particles and gangue minerals through high-speed shearing and mixing with impellers. The conventional slurry conditioning devices for mineral flotation have weak ore slurry mixing capability owing to the limitation of the internal mixing structure, resulting in a low probability of collision and adhesion between fine particles and the molecules of the chemicals due to the high following up of the fine particles to the water; in addition, the conventional slurry conditioning devices have poor adaptability to wide-particle-grade coal slime feed conditions. Therefore, it is difficult to effectively remove the fine slime coated on the surfaces of coarse particles with the conventional slurry conditioning devices. The poor slurry conditioning result causes increased burden on the subsequent flotation operation; consequently, the mechanical mixing intensity in the floatation device has to be increased, the flow field environment in the flotation process is worse, and the probability of desorption between the particles and the bubbles is increased, adverse to particle flotation and recovery.

For wide-particle-grade high-ash coal slime feed conditions, high efficiency slurry conditioning must remove the fine slime on the surfaces of cleaned coal particles to expose the fresh surfaces on one hand, and must make the ore slurry and the chemicals dispersed extensively to realize effective contact on the other hand. Therefore, it is of great significance to develop pre-flotation high efficiency slurry conditioning device and process suitable for wide-particle-grade flotation, so as to overcome the limitations of conventional slurry conditioning devices, improve the ore slurry preprocessing level, relieve the internal flow field pressure inside the floatation device, and realize wide-particle-grade coal slime flotation. Through emulsified chemical feeding by utilizing dual-channel jet circulation and counter-flow mechanical mixing for forced coupled slurry conditioning, the present invention realizes fine pre-flotation slurry conditioning of wide-particle-grade coal slime, and is beneficial for the development of a short-flow efficient flotation process.

SUMMARY OF THE INVENTION

In view of the above technical problems, the present invention provides a pre-selection high-efficiency slurry conditioning device suitable for wide-particle-grade flotation, which has a simple structure and achieves a good application effect, and realizes reversed forced turbulent mixing with strong swirling fluid moving upward from the bottom of a slurry conditioning drum by forming a forced mixing area by means of a positional and structural design of the mixing impellers and the annular cutting isolation plates.

To attain the technical object described above, the pre-selection high-efficiency slurry conditioning device for wide-particle-grade flotation provided by the present invention comprises a slurry conditioning drum including an upper part that is a columnar structure and a lower part that is a funnel-shaped inverted frustum structure, a drum cover is arranged on top of the slurry conditioning drum, the drum cover is provided with a power source and a clean water supplementing port respectively, a dual channel jet circulation chemical feed system is arranged on two sides of the slurry conditioning drum, an ore slurry outlet is arranged above a side wall of the slurry conditioning drum, two ore slurry pump separation openings not higher than the ore slurry outlet is arranged at opposing positions on two sides of the columnar structure above the side wall, an emergency material discharge port is arranged at the bottom end of the inverted frustum structure, ore slurry jet openings are arranged on two sides of the inverted frustum structure near the emergency material discharge port respectively, annular cutting isolation plates and flow guide plates are arranged in alternation from bottom to top on the inner side of the upper part of the slurry conditioning drum, and valves are arranged in the ore slurry jet openings; wherein, the dual channel jet circulation chemical feed system comprises a chemical feed pipe, which is a Venturi pipe for realizing shear jetting of the ore slurry, the Venturi pipe comprises an inlet end, a diffusion end, and a chemical feed pipe opening arranged in a throat area, the chemical feed pipe opening is connected through a pipeline and a valve to a chemical feed tank, the chemical feed tank is provided with a collecting agent feed port and a frothing agent feed port respectively; the inlet end of the Venturi pipe is connected to a T-joint via a centrifugal pump, one outlet of the T-joint serves as an ore slurry inlet, and the other outlet of the T-joint is connected to an ore slurry pump separation opening in the side wall of the slurry conditioning drum, and both of the outlets of the T-joint are provided with a valve respectively; the diffusion end of the Venturi pipe is connected through pipelines to the ore slurry jet openings, and both the ore slurry pump separation opening and the ore slurry inlet are provided with a valve respectively;

a mixing shaft is arranged inside the slurry conditioning drum in the axial direction, a top end of the mixing shaft is connected to the power source on the drum cover, a bottom end of the mixing shaft extends to a boundary between the upper part and the lower part of the slurry conditioning drum, a plurality of mixing impellers are provided on the mixing shaft, the bottommost two mixing impellers and the lowest two annular cutting isolation plates are at the same horizontal level to form a counter-flow forced mixing down-regulation area, which hampers the upward movement of the ore slurry to improve a turbulent dissipation rate of the ore slurry and enhance a down-regulation effect.

The number of the mixing impellers is greater than the number of the annular cutting isolation plate by 1 to 2; the mixing impellers are of straight-blade type, foldable-blade type or spiral-blade type, and 1 to 5 mm clearance is reserved between the periphery of the mixing impeller and the annular cutting isolation plate at the same horizontal level to effectively form a forced turbulent mixing area and prevent the impeller from jammed and damaged by coarse particles in the coal slime.

The ore slurry jet openings arranged at the two sides of the emergency material discharge port are distributed symmetrically in the inverted frustum structure of the slurry conditioning drum at the same horizontal level, and the horizontal cross sections of the pipelines of the two ore slurry jet openings are tangent to each other; after chemical feeding, the ore slurry enters the slurry conditioning drum along the pipelines through the ore slurry jet openings under pressure in a tangent direction and forms strong swirling flow fluid moving upward, which is beneficial for removing the fine slime from the surfaces of the mineral particles and optimizing the down-regulation effect.

The annular cutting isolation plates and the flow guide plates are arranged in alternation, and the annular cutting isolation plates include 1 to 3 layers of annular cutting isolation plates; each annular cutting isolation plate is provided with 4 to 12 arc-shaped shear ports evenly distributed at 15 to 30° horizontal inclination angle with 0.5 to 1.5 m curvature radius; each layer of flow guide plate is vertically fixed to the drum wall of a cylindrical section of the slurry conditioning drum and includes 4 to 12 flow guide plates that are evenly distributed.

Optimally the number of the mixing impellers is greater than the number of the annular cutting isolation plates by 1, the mixing impellers are preferably of straight-blade type, the clearance between the periphery of the mixing impeller and the annular cutting isolation plate at the same horizontal level is preferably 3 mm, the annular cutting isolation plates preferably include two layers of annular cutting isolation plates, each annular cutting isolation plate is preferably provided with 8 arc-shaped shear ports, and each layer of flow guide plates on the drum wall of the cylindrical section preferably include 8 flow guide plates.

6. The pre-flotation high efficiency slurry conditioning device for wide-particle-grade flotation according to claim 1, wherein the valves are solenoid valves, and the circulating amount of the ore slurry can be controlled in real time by adjusting the degree of opening of the valves according to the coal quality; the power source comprises an electric motor and a belt transmission structure, and the electric motor provides power to the mixing shaft via the belt transmission structure.

Beneficial Effects

1) The device in the present invention employs a dual-channel jet circulation and emulsified chemical feeding design, the molecules of the collecting agent and the frothing agent are sucked into the chemical feed pipes automatically under pressure, and are emulsified and dispersed in a high-shear ore slurry flow field; thus, the problem of poor dispersion of the conventional non-polar collecting agent in the ore slurry in the is solved, the probability of collision and contact between the particles and the molecules of the chemical is increased, and the adsorption of the molecules of the chemical on the surface of the hydrophobic fine particles is enhanced especially; with the high-gradient shear flow field design in the chemical feed pipe, a hydraulic cavitation phenomenon occurs inside the ore slurry, the precipitated tiny bubbles are conductive to the hydrophobic flocculation among fine coal slime particles, thereby the flotation effect is enhanced, the fine slime on the surfaces of high-ash coal slime particles is removed by shearing to expose the fresh surfaces to collide and contact with the molecules of the chemical, the slurry conditioning effect is enhanced, fine slime entrainment and covering in the subsequent flotation process is reduced, and the quality of the concentrate product is improved.

2) The limitations of the conventional slurry conditioning devices are overcome at a certain extent by utilizing a slurry conditioning process in which external high-shear jet circulation is coupled with internal forced turbulent mixing. After the ore slurry is pre-conditioned in an external high-gradient shear flow field, it is jetted from the bottom of the slurry conditioning drum in a tangent direction, and forms a strong swirling fluid moving upward. A forced mixing area is formed by means of an innovative positional and structural design of the mixing impellers and the annular cutting isolation plates, thereby counter-flow forced turbulent mixing is realized by utilizing strong swirling fluid flowing upward from the bottom of the slurry conditioning drum, the movement of the coal slime particles with water is greatly reduced, the turbulent energy dissipation rate of the ore slurry is improved, and the adverse effect of adhesion on the fine particles is overcome; the arc-shaped shear ports arranged in the annular cutting isolation plates decrease the stress distribution in the cutting isolation plates and improve the stability of the device on one hand, and provide shearing assistance to the strong swirling fluid moving upward and increase the shearing rate of the ore slurry on the other hand; by utilizing shear jetting coupled with forced mixing, the device increase the probability of collision and contact between the ore slurry and the molecules of the chemical, realizes fine pre-flotation slurry conditioning before wide-particle-grade feeding, and is beneficial for the development of short-flow and efficient flotation process.

3) By utilizing a process design of dual-channel jet circulation and emulsified chemical feeding coupled with counter-flow mechanical mixing forced slurry conditioning, the circulated amount and feed amount of the ore slurry can be adjusted dynamically according to the coal quality and the actual production requirement; specifically, in the case that the properties of coal slime are difficult to separate by flotation, the circulated amount should be increased while the feed amount should be decreased, and the slurry conditioning time should be increased; in the case that the properties of coal slime are uniform and is easy to separate by flotation, the circulated amount should be decreased while the feed amount should be increased, and the processing capacity should be increased. In addition, by means of a process design including chemical emulsification, ore slurry cavitation and forced mixing, etc., the hydrophobic flocculation among fine particles and the removal of fine slime from the surfaces of coarse particles can be enhanced, the ore slurry pre-processing level can be improved, the internal flow field pressure inside the floatation device can be alleviated, and wide-particle-grade coal slime flotation can be realized more easily.

In the figures: 1—belt transmission structure; 2—clean water supplementing port; 3—electric motor; 4—ore slurry outlet; 5—ore slurry pump separation opening; 6—ore slurry inlet; 7—mixing shaft; 8—centrifugal pump; 9—collecting agent feed port; 10—flow guide plate; 11—annular cutting isolation plate; 12—frothing agent feed port; 13—chemical feed pipe; 14—impeller; 15—slurry conditioning drum; 16—emergency material discharge port; 17—ore slurry jet opening.

EMBODIMENTS

Hereunder an embodiment of the present invention will be further described with reference to the accompanying drawings.

Figure 1:
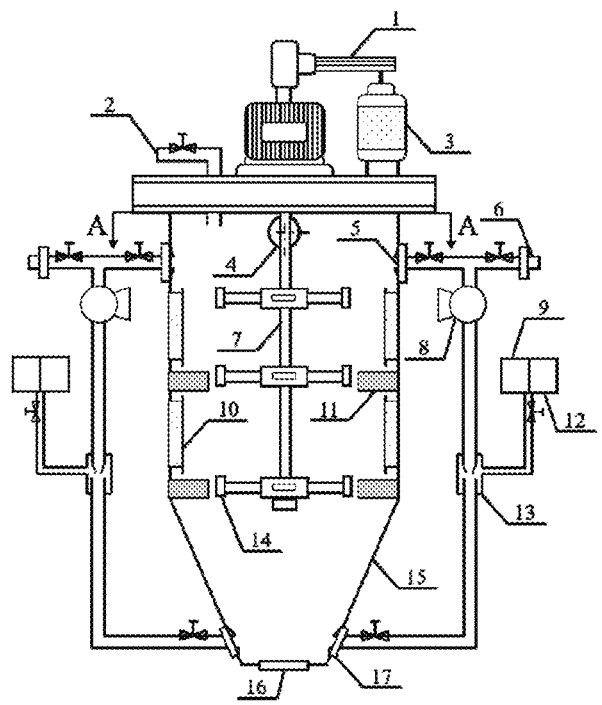
FIG. 1 is a schematic structural diagram of the swirling mixing slurry conditioning drum in the present invention.

As shown in FIG. 1, the pre-flotation high efficiency slurry conditioning device for wide-particle-grade flotation provided by the present invention comprises a slurry conditioning drum 15 including an upper part that is a columnar structure and a lower part that is a funnel-shaped inverted frustum structure, a drum cover is arranged on top of the slurry conditioning drum 15, and the drum cover is provided with a power source and a clean water supplementing port 2 respectively, a dual channel jet circulation chemical feed system is arranged on two sides of the slurry conditioning drum 15, an ore slurry outlet 4 is arranged above a side wall of the slurry conditioning drum 15, two ore slurry pump separation openings 5 not higher than the ore slurry outlet 4 are arranged at opposing positions on two sides of the columnar structure above the side wall, an emergency material discharge port 16 is arranged at the bottom end of the inverted frustum structure, ore slurry jet openings 17 are arranged on two sides of the inverted frustum structure near the emergency material discharge port 16 respectively, annular cutting isolation plates 11 and flow guide plates 10 are arranged in alternation from bottom to top on the inner side of the upper part of the slurry conditioning drum 15, and valves are arranged in the ore slurry jet openings 17; and a flow guide plate 10 is vertically mounted on a rectangular flat plate of the side wall, which hampers the ore slurry from sliding along the wall of the mixing drum under inertia, improves the turbulent dissipation intensity of the ore slurry, and enhances the slurry conditioning effect.

Figure 3:
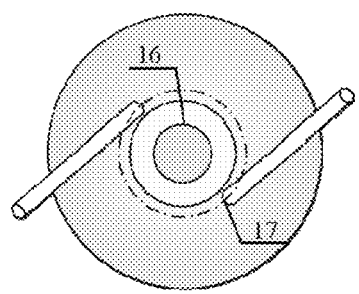
FIG. 3 is a schematic diagram of the spatial position of the pipeline at the bottom of the swirling mixing slurry conditioning drum in the present invention.

As shown in FIG. 3, the ore slurry jet openings 17 arranged on the two sides of the inverted frustum structure are distributed symmetrically at the same horizontal level, and the horizontal cross sections of the pipelines of the two ore slurry jet openings 17 are tangent to each other; after chemical feeding, the ore slurry enters the slurry conditioning drum 15 along the pipelines through the ore slurry jet openings 17 under pressure in a tangent direction and forms strong swirling flow fluid moving upward, which is beneficial for removing the fine slime from the surfaces of the mineral particles and optimizing the down-regulation effect.

Figure 2:
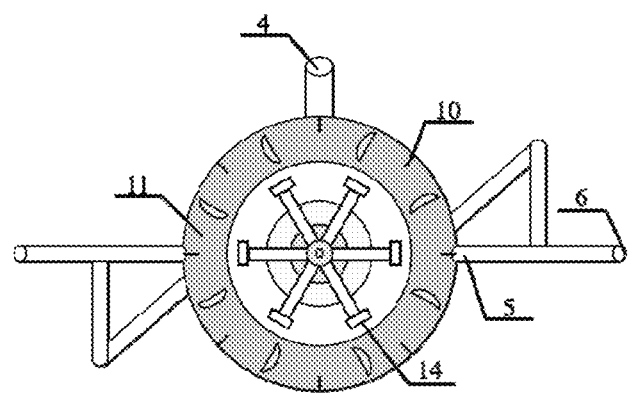
FIG. 2 is a schematic diagram of the spatial position of the pipeline at the top of the swirling mixing slurry conditioning drum in the present invention.

As shown in FIG. 2, the dual channel jet circulation chemical feed system comprises a chemical feed pipe 13, which is a Venturi pipe for realizing shear jetting of the ore slurry, the Venturi pipe comprises an inlet end, a diffusion end, and a chemical feed pipe opening arranged in a throat area, the chemical feed pipe opening is connected through a pipeline and a valve to a chemical feed tank, the chemical feed tank is provided with a collecting agent feed port 9 and a frothing agent feed port 12 respectively; the inlet end of the Venturi pipe is connected to a T-joint via a centrifugal pump 8, one outlet of the T-joint serves as an ore slurry inlet 6, and the other outlet of the T-joint is connected to an ore slurry pump separation opening 5 in the side wall of the slurry conditioning drum 15, and both of the outlets of the T-joint are provided with a valve respectively; the diffusion end of the Venturi pipe is connected through pipelines to the ore slurry jet openings 17, and both the ore slurry pump separation opening 5 and the ore slurry inlet 6 are provided with a valve respectively;

A mixing shaft 7 is arranged inside the slurry conditioning drum 15 in the axial direction, a top end of the mixing shaft 7 is connected to the power source on the drum cover, a bottom end of the mixing shaft 7 extends to a boundary between the upper part and the lower part of the slurry conditioning drum 15, a plurality of mixing impellers 14 are provided on the mixing shaft 7, the bottom-most two mixing impellers 14 and the lowest two annular cutting isolation plates are at the same horizontal level to form a counter-flow forced mixing down-regulation area, which hampers the upward movement of the ore slurry to improve a turbulent dissipation rate of the ore slurry and enhance a down-regulation effect. The number of the mixing impellers 14 is greater than the number of the annular cutting isolation plate by 1 to 2; the mixing impellers 14 are of straight-blade type, foldable-blade type or spiral-blade type, and 1 to 5 mm clearance is reserved between the periphery of the mixing impeller 14 and the annular cutting isolation plate 11 at the same horizontal level to effectively form a forced turbulent mixing area and prevent the impeller from jammed and damaged by coarse particles in the coal slime.

The annular cutting isolation plates 11 and the flow guide plates 10 are arranged in alternation, and the annular cutting isolation plates 11 include 1 to 3 layers of annular cutting isolation plates; each annular cutting isolation plate 11 is provided with 4 to 12 arc-shaped shear ports evenly distributed at 15 to 30° horizontal inclination angle with 0.5 to 1.5 m curvature radius; each layer of flow guide plate 10 is vertically fixed to the drum wall of a cylindrical section of the slurry conditioning drum 15 and includes 4 to 12 flow guide plates that are evenly distributed; optimally the number of the mixing impellers 14 is greater than the number of the annular cutting isolation plates by 1, the mixing impellers 14 are preferably of straight-blade type, the clearance between the periphery of the mixing impeller 14 and the annular cutting isolation plate 11 at the same horizontal level is preferably 3 mm, the annular cutting isolation plates 11 preferably include two layers of annular cutting isolation plates, each annular cutting isolation plate 11 is preferably provided with 8 arc-shaped shear ports, and each layer of flow guide plates 10 on the drum wall of the cylindrical section preferably include 8 flow guide plates; the valves are solenoid valves, and the circulating amount of the ore slurry can be controlled in real time by adjusting the degree of opening of the valves according to the coal quality; and the power source comprises an electric motor 3 and a belt transmission structure 1, and the electric motor 3 provides power to the mixing shaft 7 via the belt transmission structure 1.

The invention claimed is:

1. A pre-flotation high efficiency slurry conditioning device for wide-particle-grade flotation, comprising a slurry conditioning drum including an upper part that is a columnar structure and a lower part that is a funnel-shaped inverted frustum structure, a drum cover is arranged on top of the slurry conditioning drum, the drum cover is provided with a power source and a clean water supplementing port respectively, a dual channel jet circulation chemical feed system is arranged on two sides of the slurry conditioning drum, an ore slurry outlet is arranged above a side wall of the slurry conditioning drum, two ore slurry pump separation openings are arranged at opposing positions on the two sides below the ore slurry outlet, an emergency material discharge port is arranged at the bottom end of the inverted frustum structure, ore slurry jet openings are arranged on two sides of the inverted frustum structure near the emergency material discharge port respectively, annular cutting isolation plates and flow guide plates are arranged in alternation from bottom to top on the inner side of the upper part of the slurry conditioning drum, and valves are arranged in the ore slurry jet openings, wherein, the dual channel jet circulation chemical feed system comprises a chemical feed pipe, which is a Venturi pipe for realizing shear jetting of the ore slurry, the Venturi pipe comprises an inlet end, a diffusion end, and a chemical feed pipe opening arranged in a throat area, the chemical feed pipe opening is connected through a pipeline and a valve to a chemical feed tank, the chemical feed tank is provided with a collecting agent feed port and a frothing agent feed port respectively;

the inlet end of the Venturi pipe is connected to a T-joint via a centrifugal pump, one outlet of the T-joint serves as an ore slurry inlet, and the other outlet of the T-joint is connected to an ore slurry pump separation opening in the side wall of the slurry conditioning drum, and both of the outlets of the T-joint are provided with a valve respectively;

the diffusion end of the Venturi pipe is connected through pipelines to the ore slurry jet openings, and both the ore slurry pump separation opening and the ore slurry inlet are provided with a valve respectively;

a mixing shaft is arranged inside the slurry conditioning drum in the axial direction, a top end of the mixing shaft is connected to the power source on the drum cover, a bottom end of the mixing shaft extends to a boundary between the upper part and the lower part of the slurry conditioning drum, a plurality of mixing impellers are provided on the mixing shaft, the bottommost two mixing impellers and the lowest two annular cutting isolation plates are at the same horizontal level to form a counter-flow forced mixing down-regulation area, which hampers the upward movement of the ore slurry to improve a turbulent dissipation rate of the ore slurry and enhance a down-regulation effect.

2. The pre-flotation high efficiency slurry conditioning device for wide-particle-grade flotation according to claim 1, wherein the number of the mixing impellers is greater than the number of the annular cutting isolation plate by 1 to 2; the mixing impellers are of straight-blade type, foldable-blade type or spiral-blade type, and 1 to 5 mm clearance is reserved between the periphery of the mixing impeller and the annular cutting isolation plate at the same horizontal level to effectively form a forced turbulent mixing area and prevent the impeller from jammed and damaged by coarse particles in the coal slime.

3. The pre-flotation high efficiency slurry conditioning device for wide-particle-grade flotation according to claim 1, wherein the ore slurry jet openings arranged at the two sides of the emergency material discharge port are distributed symmetrically in the inverted frustum structure of the slurry conditioning drum at the same horizontal level, and the horizontal cross sections of the pipelines of the two ore slurry jet openings are tangent to each other; after chemical feeding, the ore slurry enters the slurry conditioning drum along the pipelines through the ore slurry jet openings under pressure in a tangent direction and forms strong swirling flow fluid moving upward, which is beneficial for removing the fine slime from the surfaces of the mineral particles and optimizing the down-regulation effect.

4. The pre-flotation high efficiency slurry conditioning device for wide-particle-grade flotation according to claim 1, wherein the annular cutting isolation plates and the flow guide plates are arranged in alternation, and the annular cutting isolation plates include 1 to 3 layers of annular cutting isolation plates; each annular cutting isolation plate is provided with 4 to 12 arc-shaped shear ports evenly distributed at 15 to 30° horizontal inclination angle with 0.5 to 1.5 m curvature radius; each layer of flow guide plate is vertically fixed to the drum wall of a cylindrical section of the slurry conditioning drum and includes 4 to 12 flow guide plates that are evenly distributed.

5. The pre-flotation high efficiency slurry conditioning device for wide-particle-grade flotation according to claim 2, wherein optimally the number of the mixing impellers is greater than the number of the annular cutting isolation plates by 1, the mixing impellers are preferably of straight-blade type, the clearance between the periphery of the mixing impeller and the annular cutting isolation plate at the same horizontal level is preferably 3 mm, the annular cutting isolation plates preferably include two layers of annular cutting isolation plates, each annular cutting isolation plate is preferably provided with 8 arc-shaped shear ports, and each layer of flow guide plates on the drum wall of the cylindrical section preferably include 8 flow guide plates.

6. The pre-flotation high efficiency slurry conditioning device for wide-particle-grade flotation according to claim 1, wherein the valves are solenoid valves, and the circulating amount of the ore slurry can be controlled in real time by adjusting the degree of opening of the valves according to the coal quality; the power source comprises an electric motor and a belt transmission structure, and the electric motor provides power to the mixing shaft via the belt transmission structure.

* * * * *